Shaw & Tindall,
Wind Wheel.

No. 78,333. Patented May 26, 1868.

Witnesses
Theo Fischer
J. A. Fraser

Inventor
H. W. Shaw
Geo. G. Tindall
Per Munn & Co.
Attorneys

United States Patent Office.

HIRAM M. SHAW AND GEORGE G. TINDALL, OF FREMONT, OHIO.

Letters Patent No. 78,333, dated May 26, 1868.

IMPROVEMENT IN WINDMILLS.

The Schedule referred to in these Letters Patent and making part of the same.

TO ALL WHOM IT MAY CONCERN:

Be it known that we, HIRAM M. SHAW and GEORGE G. TINDALL, of Fremont, in the county of Sandusky, and State of Ohio, have invented a new and improved Windmill; and we do hereby declare that the following is a full, clear, and exact description thereof, which will enable those skilled in the art to make and use the same, reference being had to the accompanying drawings, forming part of this specification.

This invention consists in a new and improved arrangement for pumping or raising water by the power of the wind, and in controlling that power by the weight of the water so raised, whereby many advantages not hitherto secured by the application of such power are obtained, as will be hereinafter described.

Similar letters of reference indicate corresponding parts.

Figure 1:
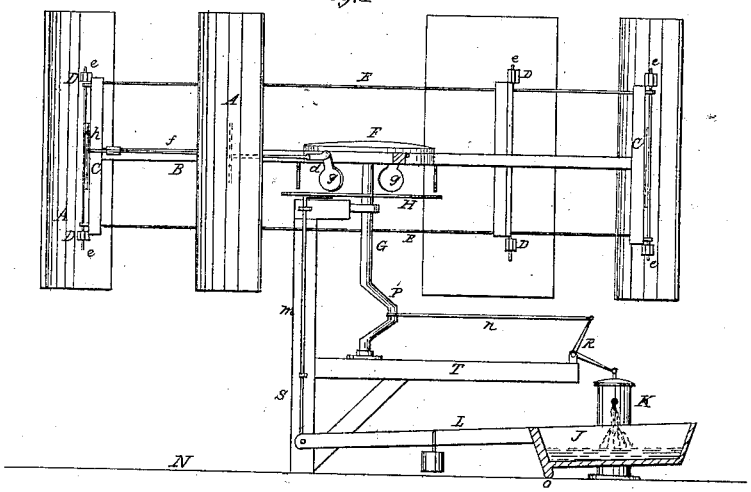
Figure 1 represents a vertical elevation of the machine, as applied to the purpose of pumping water.
Figure 2:
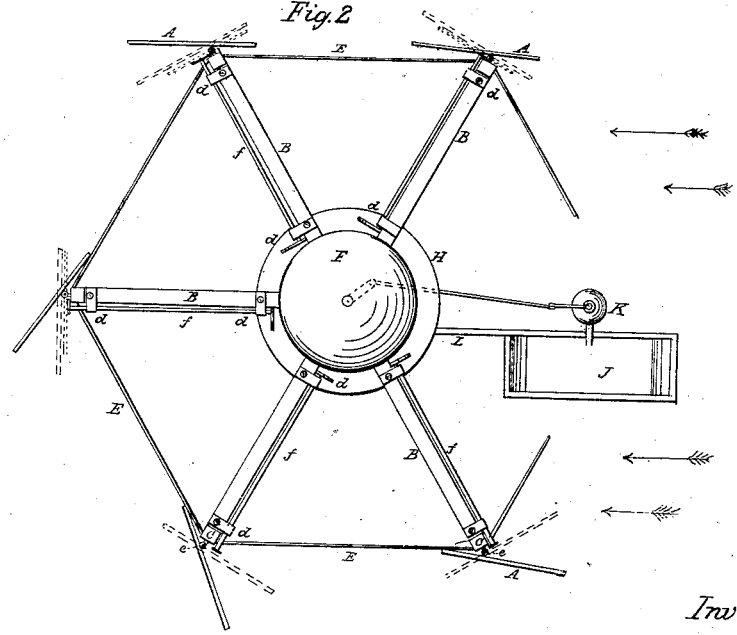
Figure 2 is a top or plan view of the same.

The power of the wind is applied to a horizontal wind-wheel attached to the upper end of a vertical crank-shaft. The wings of this wheel, six (more or less) in number, stand in a vertical position attached to horizontal arms, which radiate from the centre.

A represents the wings, which are of rectangular form, and hinged to the ends of the arms, so that they readily adjust themselves, when left free, to the current of the winds, their action, when in operation, being controlled by the rods which connect the arms.

The wings are not hinged or connected with the arms centrally, as regards their width, but at about one-third of their width from one of their edges, as seen in the drawing.

B represents the arms. The outer ends of these arms are in the form of a -+, the cross being vertical, and the wings are confined by a hinge at each end of the cross, as seen in the drawing.

C represents the cross.

D represents the hinge. This hinge is formed by eyes attached to the wings and to the cross, through which a rod, $e$, passes.

E represents horizontal rods, which are attached to the crosses, as seen in fig. 1.

F represents the eye or centre of the wheel, and

G is the upright crank-shaft, to the upper end of which the wheel is attached.

H is a movable disk on the shaft G.

J is a water-trough, placed beneath the spout of the pump K.

L is a weighted arm, which is attached to the trough, the end of which is connected with the disk H by the rod $m$.

When empty, or partially so, the water-trough will stand as seen in the drawing, supported on the platform N at one end, as at $o$.

When it is filled, or nearly filled with water, the weight of the water will tilt it so that the other end will rest on the platform, which motion will of course elevate the end of the arm L, which will raise the disk H, which slides loosely up and down on the shaft.

This action communicates motion to the wings, throwing them from the wind, or altering their position so that they become inoperative.

The motion to the wings is imparted in the following manner:

To each of the arms, and placed parallel therewith, there is a rod, $f$, secured by boxes, so that it can turn or partially revolve. $d$ represents these boxes.

To the inner ends of these rods there is a weighted arm, $g$, which is designed to hang above the disk H in such a position that it will act as a crank, and turn or partially revolve the rod, when the disk is raised, as before described.

When the wind-wheel is in operation or pumping, it is not intended that these arms shall be in contact with the disk.

On the opposite ends of the rods $f$ there is a T-formation, marked $h$, the cross of which stands vertical when the wings are taking the wind or in operation.

When the water-trough is filled sufficiently to tilt, the disk is raised, and the rod $f$ is partially rotated, or given a quarter of a revolution, which motion throws the cross $h$ from a vertical to a horizontal position, and as it operates outside of the cross on the arm, and in contact (or nearly so) with the inside or back of the wings, it will be seen that the position of the wing will be altered thereby, or thrown so as to become inoperative. In this position they will be held until, by the removal of the water, the trough tilts back and lowers the disk.

Motion to the pump-rod may be imparted by a rod, $n$, from the crank P, on the shaft and bell-crank R, as seen in the drawing, or by any other suitable mechanical means.

The apparatus is placed upon a platform, N, and the shaft and wheel are supported from an upright post, S, from which an arm, T, projects for the shaft and bell-crank, as seen in the drawing.

Having thus described our invention, we claim as new, and desire to secure by Letters Patent—

1. The rods $f$, when provided at their outer ends with the cross $h$, in combination with the disk H and weighted arm $g$, whereby, as the disk is raised, the cross $h$ is changed from a vertical to a horizontal position, to render the sails inoperative, as herein shown and described.

2. The combination of the pivoted trough J, rod $m$, disk H, weighted arms $g$, eye F, rods $f$, cross $h$, and hinged sails A, all arranged as described, for the purpose specified.

HIRAM M. SHAW,
GEORGE G. TINDALL.

Witnesses:
 THOMAS R. GOULD,
 D. W. GOULD.